United States Patent [19]

Norris

[11] Patent Number: 4,656,525

[45] Date of Patent: Apr. 7, 1987

[54] ELECTRONIC IMAGING COPIER

[75] Inventor: Philip R. Norris, Reading, Mass.

[73] Assignee: Polaroid Corporation, Cambridge, Mass.

[21] Appl. No.: 804,595

[22] Filed: Dec. 4, 1985

[51] Int. Cl.4 .............................................. H04N 1/40
[52] U.S. Cl. .................................. 358/280; 358/284; 358/76; 358/909; 358/80
[58] Field of Search ............... 358/280, 282, 284, 214, 358/75, 76, 80, 903, 909; 382/54; 355/4, 5, 20

[56] References Cited

U.S. PATENT DOCUMENTS

| | | | |
|---|---|---|---|
| 3,824,336 | 7/1974 | Gould et al. | 358/214 |
| 3,988,602 | 10/1976 | Gorsica, Jr. | 358/214 |
| 4,130,834 | 12/1978 | Mender et al. | 358/127 |
| 4,250,522 | 2/1981 | Seki et al. | 358/76 |
| 4,430,668 | 2/1984 | Miles, Jr. | 358/78 |
| 4,433,345 | 2/1984 | Haddick et al. | 358/244 |
| 4,463,373 | 7/1984 | Mikami | 358/76 |
| 4,488,244 | 12/1984 | Freeman | 364/525 |
| 4,536,848 | 8/1985 | d'Entremont et al. | 364/526 |
| 4,538,183 | 8/1985 | Kanno | 358/280 |
| 4,541,010 | 9/1985 | Alston | 358/44 |
| 4,602,294 | 7/1986 | Yamada | 358/280 |

Primary Examiner—Edward L. Coles, Sr.
Attorney, Agent, or Firm—John S. Vale

[57] ABSTRACT

An electronic imaging copier is provided for making enhanced photographic copies of reflection print and transparency types of photographs. An optical image of an original print or transparency is scanned twice to provide first and second sets of image signals representative of low and higher resolution versions of the image. At least a portion of the low resolution first set of signals is employed to provide a preview display of the image. The first and second sets of signals are processed to provide a third set of signals representative of an enhanced version of the image which is projected onto a film unit to provide the photographic copy.

25 Claims, 12 Drawing Figures

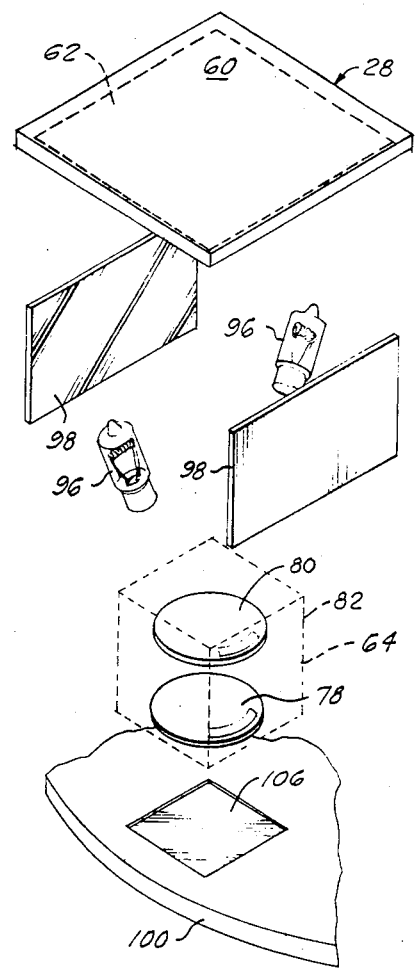
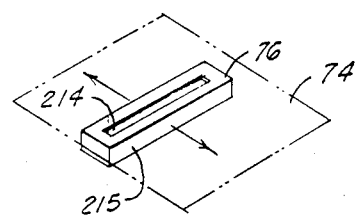
FIG. 4

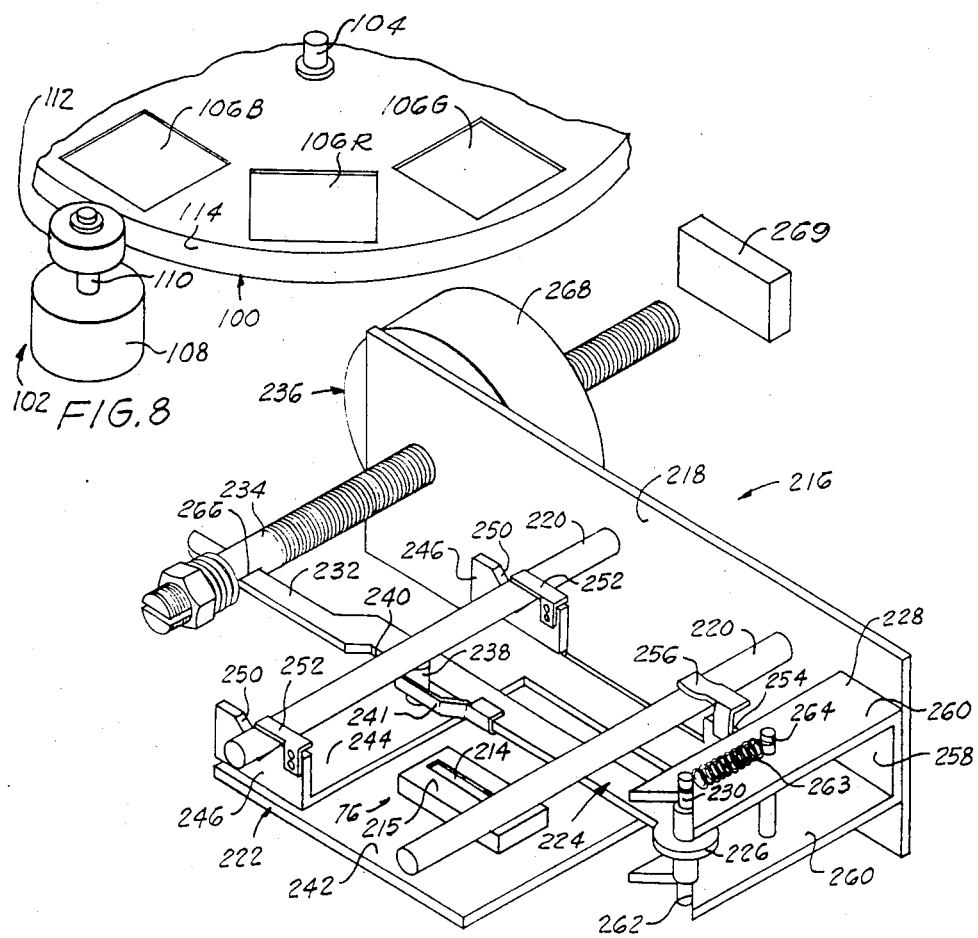

ELECTRONIC IMAGING COPIER

BACKGROUND OF THE INVENTION

The present invention relates to the field of photocopying and, more specifically, to an electronic imaging copier for making enhanced photographic prints from original reflective print and transparency (e.g. slide and/or negative) types of photographs.

Electronic imaging systems for recording still images on photosensitive film are well known in the art.

For example, U.S. Pat. No. 4,130,834 discloses a system comprising a high resolution video camera for scanning an optical image of an object and converting the optical image into corresponding electronic image signals; a monitor for displaying the image provided from the camera; a volatile storage buffer, memory or storage tube for temporarily storing the image signals; a tape recorder for recording the image signals provided from the memory; and a printing monitor or CRT responsive to the stored image signals for providing an optical image of the object which is used to expose a photosensitive sheet and photographically record the image thereon. Color images are printed or recorded by exposing color film, in sequence, to black and white CRT images, representative of the red, green and blue components of the image, through corresponding red, green and blue filters. It is also suggested that the stored image may be enhanced electronically with regard to saturation, brightness, image inversion and for limiting the reproduction to a selected part of the image.

Other systems, sometimes referred to as electronic imaging film recorders, do not include integral devices for providing electronic image signals, such as video camera or CCD line scanner, but rather are adapted to receive image signals from various sources connected thereto such as a computer, video camera, or video tape recorder.

Such film recorders may typically include signal processing systems for enhancing the image signals to improve image quality and/or more closely match the projected image to the spectral sensitivity characteristics of the photosensitive material on which the image is to be recorded. Enhancement may include adjustment of the brightness and contrast range; adjustment of color saturation and balance; image inversion (reverse video); adding text or graphic information to the picture; selective cropping; and image magnification. For representative examples of these types of film recorder, reference may be had to U.S. Pat. Nos. 4,433,345; 4,488,244 and 4,536,848.

The present invention is directed to an electronic imaging copier that is specifically configured for making photographic prints from original reflection prints, slides or negatives.

The most common method of having such prints made is to bring the original photograph to a photographic dealer or the photographic department of a store which arranges to ship them off to a processing laboratory for duplication. To obviate the inconvenience of waiting for the results and returning to the store for pickup, it would be highly desirable to have a self-contained copier apparatus for in-store service which quickly produces high quality copies while the customer waits.

Unlike the prior art electronic imaging system identified above, such a copier should be specifically tailored to producing a copy from an original photograph; be adept at producing prints from both reflection prints and transparencies; be highly automated and easy to use so that it may be operated by a store employee without formal training in photography and film processing; provide a preview display of the image to be recorded for observing composition, focus, etc.; employ electronic image enhancing techniques for improving image quality and matching the spectral characteristics of the original photograph to those of the copy film; and be of relatively low cost and complexity by, for example, minimizing the amount of memory needed to store image signals for enhancement and printing purposes.

One technique for minimizing the amount of memory required to effect image enhancement is to first make a low resolution scan of the object and store the low resolution signals in a relatively small buffer and then make a higher resolution scan of the object and combine the high resolution with the low resolution signals from memory to effect image enhancement. Examples of this technique are disclosed in commonly assigned copending applications U.S. Ser. No. 681,788 filed on Dec. 14, 1984 by Lawrence E. Alston for "Electronic Image Scanner and Copier System with Color Matrix Image Enhancement" and U.S. Ser. No. 682,894 filed on Dec. 18, 1984 by Lawrence E. Alston et al. for "Image Sensing and Processing Apparatus and Method".

For an example of an electronic imaging apparatus wherein low resolution image signals are utilized to provide a black and white display of an image captured by an electronic scanning device, reference may be had to commonly assigned U.S. Pat. No. 4,541,010.

Therefore, it is an object of the present invention to provide an electronic imaging copier for making photographic copies from original reflection print and transparency type photographs.

Another object is to provide such a copier that is easy to use and may be operated to produce high quality results by persons not having formal training in photography.

Yet another object is to provide such a copier that is relatively economical to produce.

Another object is to provide such a copier that provides electronic image enhancement, a preview display of the image to be recorded on film, and uses a minimum amount of memory to provide these two functions.

Other objects of the invention will, in part, be obvious and will, in part, appear hereinafter.

SUMMARY OF THE INVENTION

The present invention provides an electronic imaging copier specifically configured to make enhanced photographic prints from reflection prints and transparency types of photographs.

The copier is adapted to operate in both print and transparency copying modes of operation and includes means for supporting a print to be copied at a first object plane and means for supporting a transparency to be copied at a second object plane.

Optical means operate selectively in the print copying mode for providing an optical image of the supported print, and in the transparency copying mode for providing an optical image of the supported transparency.

The optical image is sensed by photoresponsive means, such as a CCD or the like, which is operable to provide in sequence a first set of electronic image signals corresponding to a low resolution version of the optical image, and a second set of electronic image signals corresponding to a higher resolution version of the optical image.

Display means, responsive to at least a portion of the first (low resolution) set of image signals displays a low resolution version of the image which the operator uses to preview the image to be recorded.

Signal processing means are provided for processing the first and second sets of signals and producing therefrom a third set of image signals corresponding to an enhanced version of the image.

The copier additionally includes means for supporting a photosensitive film unit at an exposure plane, and means, such as a CRT or the like, responsive to the third set of image signals for providing an enhanced optical image and for projecting the enhanced image on to the exposure plane to effect the exposure of the film unit thereat.

Advantageously, the present invention provides an apparatus for sensing, displaying, and enhancing an image and utilizes image signals corresponding to a low resolution version of the image for both display (preview) and image enhancement purposes.

BRIEF DESCRIPTION OF THE DRAWINGS

For a fuller understanding of the nature and objects of the present invention, reference may be had to the following detailed description taken in connection with the accompanying drawings wherein:

FIG. 4 is an exploded view showing selected components of the imaging and print illumination systems;

FIG. 8 is a perspective view of a portion of a filter wheel drive system;

FIG. 9 is a perspective view showing selected components of a CCD indexing system;

DESCRIPTION OF THE PREFERRED EMBODIMENT

Figure 1:
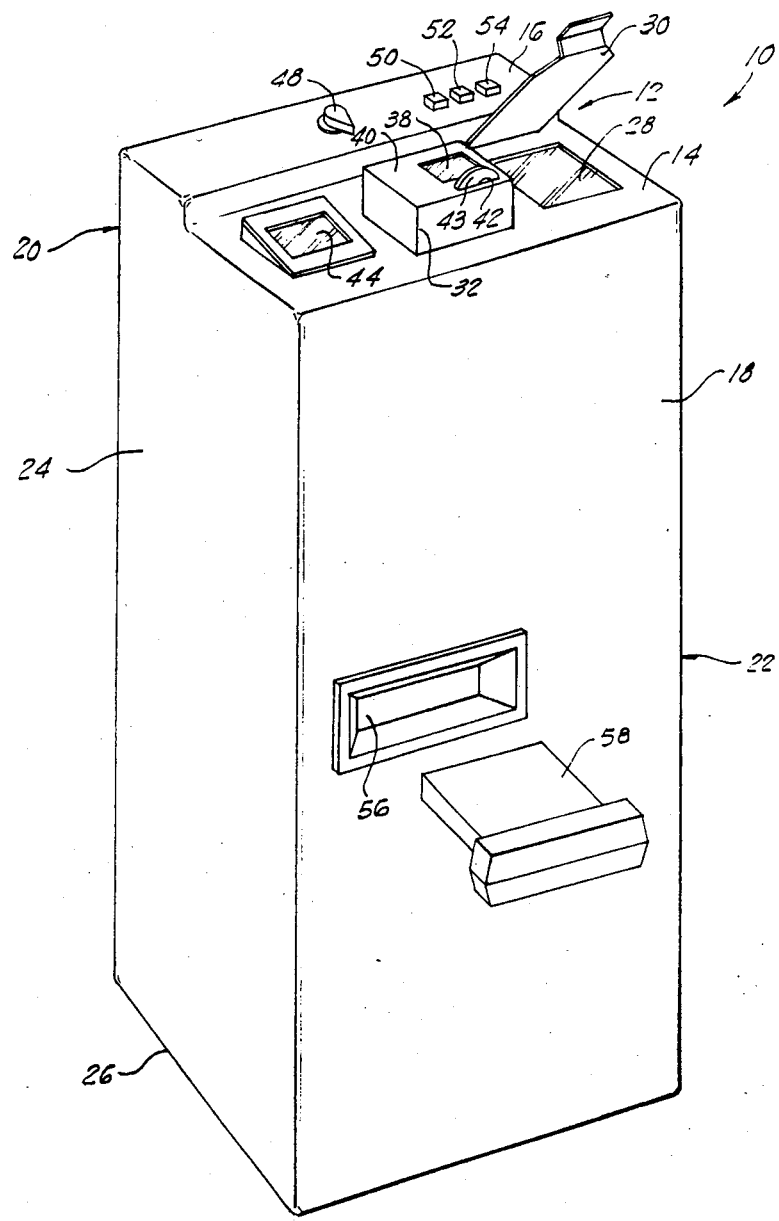
FIG. 1 is a perspective view of an electronic imaging copier embodying the present invention.
Figure 2:
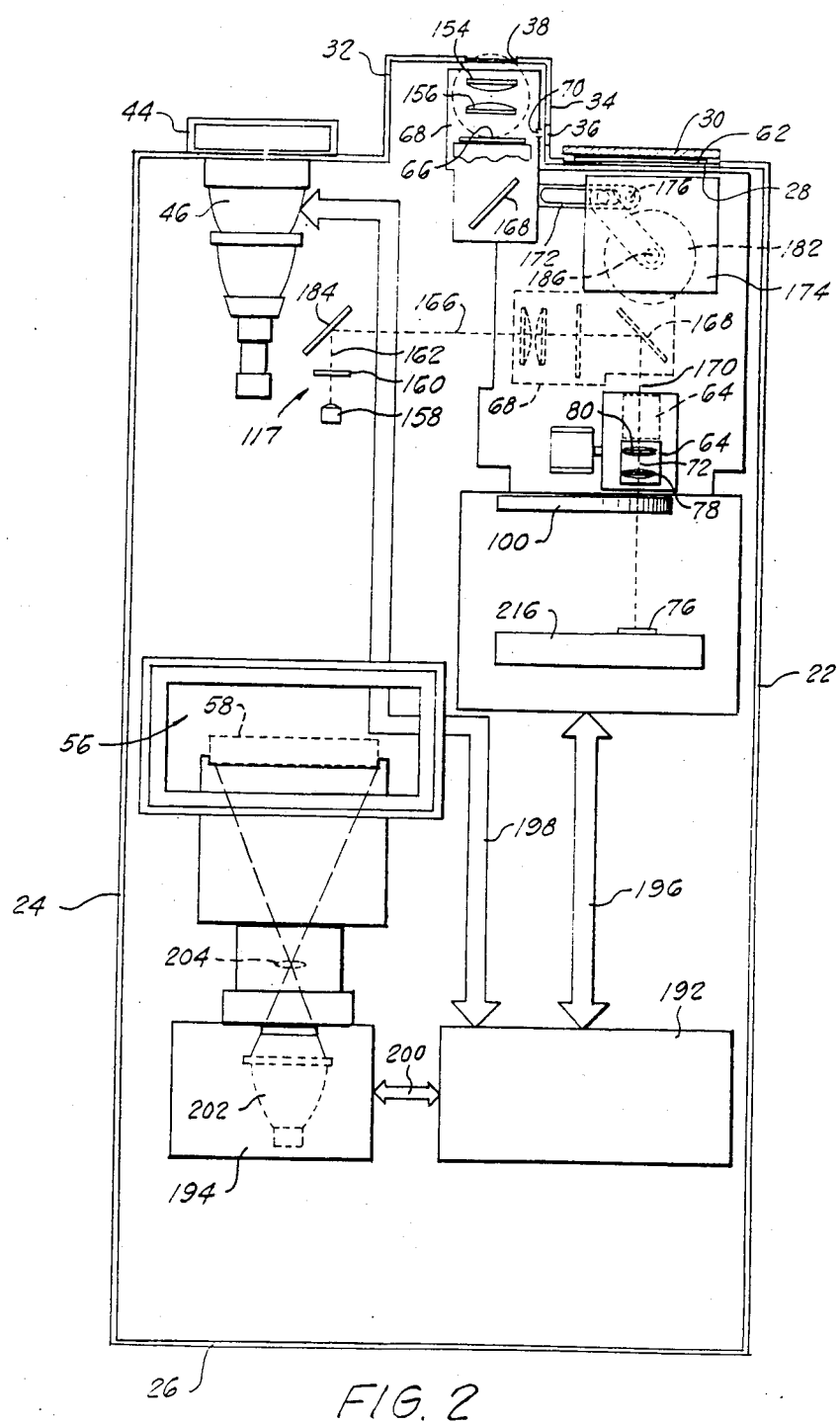
FIG. 2 is a front elevational view, partly in section, of the copier of FIG. 1.

Referring to FIGS. 1 and 2, the present invention provides an electronic imaging copier 10 for making enhanced photographic print copies from original reflection print and transparency types of photographs.

In the illustrated embodiment, copier 10 is a free standing unit enclosed in a generally parallelepiped shaped housing 12 having a stepped top wall, comprising a forward wall section 14 and a raised rear wall section 16, a forward wall 18, a rear wall 20, a pair of opposed side walls 22 and 24, and a bottom wall 26.

Mounted on the right hand end of the top wall forward section 14 is a rectangular transparent print supporting window 28. A print window cover 30, hinged to wall section 14 near the rear edge of window 28, is movable between a raised open position (FIG. 1) and a closed position (FIG. 2) where it overlies window 28 and holds an original print to be copied flat against window 28. In combination, window 28 and cover 30 define a print supporting station.

To the left of the print supporting station is a box-like upstanding housing section 32 for receiving a portion of a later to be described slide housing mounted for movement within housing 12. Housing section 32 includes a side wall 34 having a slide insertion and withdrawal slot 36 therein, and a slide observation window 38 in its top wall 40 along with an adjacent elongated slot 42 through which a slide positioning friction wheel 43, associated with the internal slide housing, projects.

To the left of housing 32 is a preview display window 44 through which the operator may view a display of an image to be projected onto the copy film provided on an electronic imaging display device such as the illustrated CRT (Cathode Ray Tube) 46 mounted on the underside of wall section 14.

Mounted on the rear wall section 16 are a plurality of operator actuable control switch actuators including a two position mode selection knob 48 movable between print and transparency copy mode settings; a preview display button 50; a print or copy cycle actuating button 52; and a cycle stop or abort button 54.

In the illustrated preferred embodiment, copier 10 is configured for utilizing self-developing film to produce copy prints in a minimum amount of time. As such, it includes a rectangular opening 56 in forward wall 18 through which a self-developing film holding and processing cassette 58 of conventional construction is adapted to be slidably inserted to locate a film unit therein at a later to be described exposure plane within housing 12.

As best shown in FIGS. 2 and 4, the print supporting window 28 is a rectangular transparent glass or plastic sheet having an upper exterior print supporting surface 60 on which an original photographic print 62 is adapted to be placed, face down, to locate the print 62 at a first object plane, defined by surface 60, which is in alignment with a movable objective lens 64 mounted within housing 12 below and in centered alignment with the window 28.

An original photographic transparency to be copied, in the illustrated embodiment a 35 mm slide transparency 66 mounted in a standard cardboard or plastic frame, is adapted to be received and supported in a slide housing 68 mounted within housing 12 for pivotal movement between an inoperable slide receiving position, shown in solid lines in FIG. 1, wherein housing 68 is vertically disposed with its upper end projecting into housing section 32 to align a slot 70 in housing 68 with slot 36 in housing section 32 and wherein housing 68 is not in operative relation with lens 64; and an operative position, as shown in dotted lines, wherein housing 68 is pivotted downwardly to a lower horizontal position within housing 12 to bring it into operative relation with lens 64.

The objective lens 64, which may be a single or multi-element lens assembly, serves as means for forming or providing a focused image of a supported print 62 or a supported slide 66 (when housing 68 is in the operative position) at an image plane.

In the illustrated embodiment, lens 64 is mounted for vertical movement in the direction of its optic axis 72 between a print imaging position (shown in solid lines in FIG. 2) wherein it forms a focused image of a supported print 62 at an image plane 74 (see FIG. 4) in the field of view of a photoresponsive device, such as the illustrated line scanning CCD (Charge Coupled Device) assembly 76, and a raised transparency imaging position (shown in dotted lines) wherein lens 64 forms an image of a supported slide 66 at the image plane 74.

Figure 5:
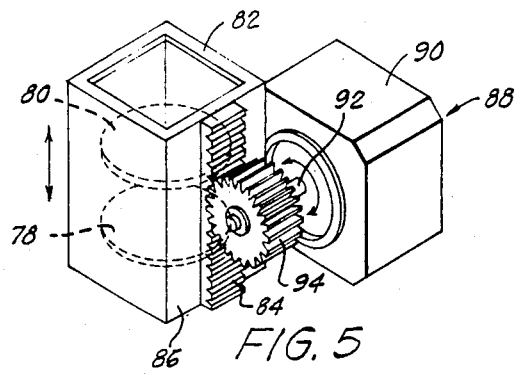
FIG. 5 is a perspective view of selected components of a lens drive system.

Copier 10 includes means for selectively moving lens 64 between the print and transparency imaging positions. As best shown in FIG. 5, the illustrated embodiment of lens 64 comprises a pair of lens elements 78 and 80 held in a square lens tube 82 that is mounted between a pair of vertical guidetracks (not shown). The means for effecting movement of lens 64 includes, in combination a vertical rack 84 secured to a rear wall 86 of tube 82, and a lens drive assembly 88 comprising a reversible stepper motor 90 having an output shaft 92 on which is fixed a pinion gear 94 in mesh with the rack 84. When the motor 90 is driven in the clockwise direction (as viewed in FIG. 5) the rack and pinion arrangement moves the lens 64 upwardly. When the direction of the motor is reversed, the lens 64 is moved downwardly. As will be described in detail later, motor 90 is operated under the control of a copier control system which is responsive to the setting of the mode selection switch 48 for effecting movement of lens 64 between the print and transparency imaging positions.

In the print copy mode, the slide housing 68 is in its raised inoperative position removed from the straight line optical path between print support window 28 and the objective lens 64. As noted earlier, lens 64 is in its lowermost print imaging position where it projects a focused image of the original print 62 at the first object plane, defined by surface 60, onto the image plane 74 below lens 64.

To illuminate the print 62 on window 28, copier 10 includes a print illumination system comprising a pair of oppositely disposed lamps 96 and a cooperating pair of oppositely disposed mirrors 98 set at 90° with respect to the lamps 96. Lamps 96 and mirrors 98 are arranged in a box-like configuration between window 28 and lens 64 where they are outside the field of view of lens 64 and are not included in the image of the print 62 provided by the lens. The mirrors 98 reflect light from the lamps 96 which combines with the light emitted directly from the lamps 96 to more evenly illuminate the print 62.

The illustrated copier 10 is configured to copy color prints and transparencies by acquiring separate electronic signal records of the red, green, and blue components of the print or transparency. As such, copier 10 is provided with means for sequentially presenting red, green, and blue color filters into the optical path between the exit pupil of lens 64 and the image plane 74.

As best shown in FIGS. 2, 4 and 8, the filter presenting means includes a filter wheel 100 and a filter wheel drive or indexing assembly 102.

The filter wheel 100 is adapted to rotate about a central axle shaft 104 and has at least one, or preferably two, sets of green, red, and blue filters 106g, 106r, and 106b, respectively, disposed in sequence about the peripheral edge of wheel 100. Wheel 100 is rotatably mounted on shaft 104 to the left of and just below lens 64 for rotation in a horizontal plane so that each filter 106 is sequentially presented in the optical path between the exit pupil of lens 64 and the image plane 74. The wheel drive assembly 102 comprises a stepper motor 108 having an output drive shaft 110 that carries a capstan wheel 112 fixed thereto such that it frictionally engages the outer edge 114 of wheel 100 to rotatably drive the wheel 100 in response to the operation of motor 108 which is controlled be a later to be described control system.

As will become apparent later, during the course of a copy cycle, copier 10 will first make a low resolution scan of the red, green, and blue components of the image provided by lens 64 and then a higher resolution scan of these three color components. Therefore, wheel 100 preferably includes two sets of the three filters (6 filters in all) equally spaced about the periphery so that both the low and higher resolution scans may be made by indexing wheel through a full 360° revolution. If wheel 100 only has one set of red, green, and blue filters thereon, it will have to rotate through two full revolutions to make the low and high resolution scans, or its direction would have to be reversed after the first scan to bring the first color filter 106g back to the operative position in alignment with lens 64 before starting the second scan.

In the transparency copying mode of operation, the slide housing 68 is initially located in its raised inoperative position where the operator may load a slide 66 thereinto. Then, housing 68 is pivoted to a lower horizontal position to bring it into operative relation with lens 64 and a slide illumination assembly 117.

Figure 7:
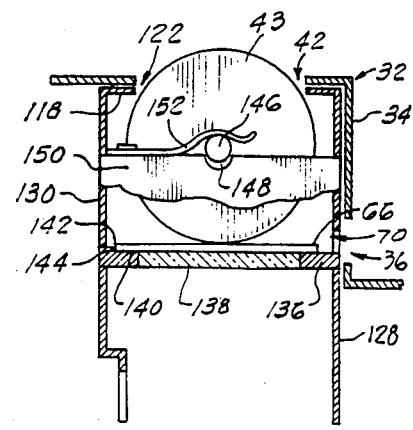
FIG. 7 is a side elevational view, partly in section, showing selected components of the slide housing.
Figure 6:
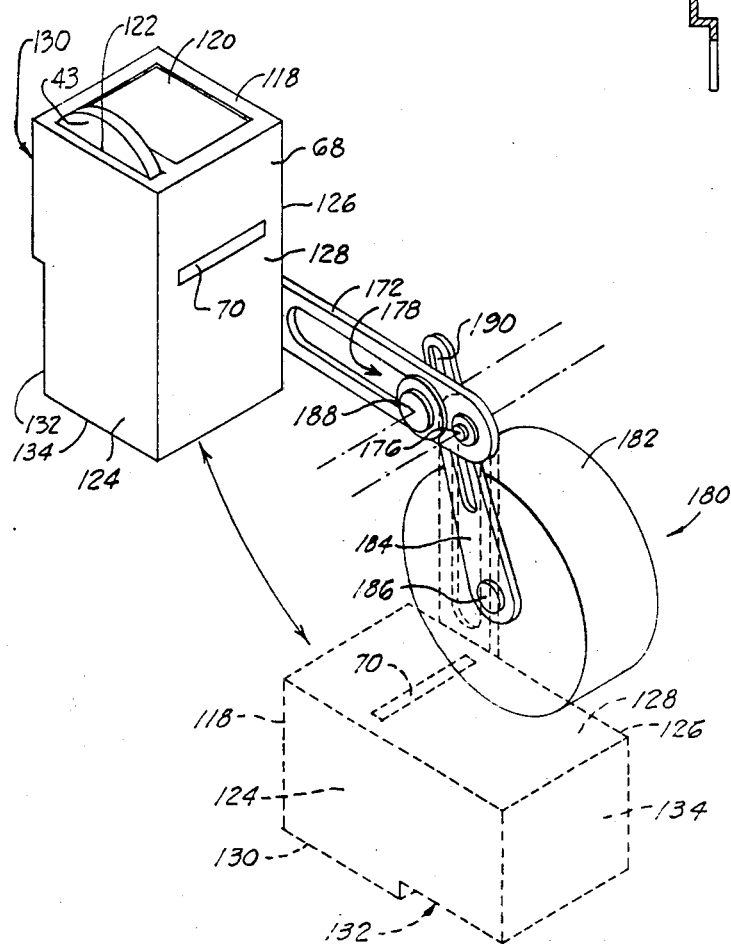
FIG. 6 is a perspective view of selected components of a slide housing assembly showing the slide housing at its operative position in solid line and at its inoperative position in dotted lines.

As best shown in FIGS. 2, 6, and 7 slide housing 68 is a hollow tube-like structure having a generally rectangular cross section. It includes a top wall 118 having a square opening 120 therein along with an elongated slot 122 through which the upper end of friction wheel 43 protrudes. Other walls defining housing 68 include a forward wall 124, a rear wall 126, a first side wall 128 having the horizontal slide entry and withdrawal slot 70 therein, an opposite side wall 130 having an opening 132 at the lower end thereof, and a bottom wall 134.

As best shown in FIG. 7, disposed within housing 68 is a horizontal slide support member or shelf 136 that is fixed to the interior surfaces of the surrounding walls and includes therein a centrally disposed transparent window 138 that is dimensioned to be a little larger than the 35 mm film portion of slide 66. The upper surfaces of shelf 136 and window 138 define a co-planar slide supporting surface 140 that is level with the bottom of opening 70 and extends across the interior of housing 68 until it terminates at a vertical stop surface 142 in shelf 136, adjacent wall 130, against which the leading edge 144 of slide 66 bears to define the fully inserted position of slide 66 within housing 68. As will become apparent, surface 140 defines a second object plane of the optical imaging system when housing 68 is at its operative position.

Slide 66 is moved into and out of housing 68 with the aid of the friction wheel 43 which is preferably formed of a compliant material having a high co-efficient of friction such as rubber or the like. Wheel 43 has a fixed axle shaft 146 which is captured in semi-circular bearing notches 148 formed in the upper edges of a pair of spaced horizontal friction wheel support members 150 extending between and fixed to housing side walls 128 and 130 adjacent the interior surface of forward wall 124. The wheel 43 is preferably spring biased downwardly toward surface 140 of window 138 by a leaf spring 152 having one end thereof fixed to one member 150 and its opposite curved free end in overlying engagement with the upper portion of shaft 146 to exert a downwardly directed spring force thereon.

When there is no slide 66 in housing 68, spring 152 pushes the wheel 43 downwardly so that the bottom edge thereof engages the top surface 140 of window 138. As the user inserts a slide 66 through opening 36 of housing 32 and the aligned slot 70 of the raised housing 68, the leading edge of the slide advances between surface 140 and the bottom edge of wheel 43. The entry of the slide in this manner cams the wheel 43 upwardly, but the biasing force of spring 152 maintains the bottom edge of wheel 43 in frictional engagement with the upper surface with the slide mount frame.

Now, in response to the use of manually rotating wheel 43 in the clockwise direction, using the upper end of wheel 43 which extends through slot 42, the slide 66 is advanced to the left into housing 68 until the leading edge 144 abuts against the stop surface 142. Once the slide is at the fully inserted position, continued rotation of the wheel 43 will only cause it to slide over the top surface of slide 66 because the holding force provided by stop 42 is substantially greater than the friction force generated at the interface between wheel 43 and the slide mount. To remove the slide 66, the user merely rotates wheel 43 in the counter-clockwise direction which drives the slide 66 to the right as viewed in FIG. 6.

As best shown in FIG. 2, slide housing 66 has a pair of spaced-apart condensing lenses 154 and 156 located between the top opening 120 in wall 118 and the slide supporting shelf 136. These condensing lenses serve to concentrate light transmitted by the slide illumination assembly 117 through opening 120 and direct the light in a beam onto the backside of the slide 66 to backlight the slide 66. The illumination assembly 117 in the illustrated embodiment comprises a the lamp 158, a diffuser plate 160 for diffusing light emitted from lamp 158 which is directed along optical path 162, and a mirror 164, set at an angle of 45° with respect to path 162, for reflecting the light along an optical path 166 (at 90° to path 162) to the opening 120 in housing 68.

Image bearing light from the back-lighted slide 66 which is transmitted along path 166 is reflected by a mirror 168 disposed in housing 68, between the slide support member 136 and the bottom wall 134, at a 45° angle to the object plane defined by the surface 140. The light reflected by mirror 168 travels along an optical path 170 (at 90° to path 168), through opening 132 and into lens 64 located at its raised slide imaging position, which in turn provides a focused image of the slide 66 at the image plane 74.

The slide housing 68 is mounted within housing 12 for pivotal motion between its operative and inoperative positions by means of a pivot link 172 having one end fixed to housing rear wall 126 and its opposite and pivotally connected vertical plate 174 at pivot pin 176 (see FIG. 2). Link 172 has an elongated slot 178 therein for connecting link 172 to a drive system 180.

The drive system 180 comprises a stepper motor 182 secured to a plate (not shown) in housing 12, and a drive link 184 that has one end fixed to the output drive shaft 186 of motor 182 and is connected to link 172 by a connecting pin assembly 188 which extends through slot 178 in link 172 and a cooperating slot 190 in link 184.

In FIG. 6, the slide housing 68 is shown at its raised inoperative slide insertion and withdrawal position in solid lines and at its operative slide copying position in dotted lines.

When housing 68 is in the raised position, link 172 is substantially horizontal. In response to stepper motor 182 being driven in a counter-clockwise direction through a predetermined number of steps, link 184 rotates in the counter-clockwise direction and exerts a counter-clockwise rotational force or torque on link 172 through the connecting pin assembly 188. In response to this torque, link 172 pivots in a counter-clockwise direction about pin 176 and carries the housing 68 downwardly therewith to the operative position shown in dotted lines. The slide housing 68 is raised or moved back to its operative position by reversing the drive direction of motor 182 and indexing it through the same number of predetermined steps. The operation of motor 182 is controlled by the control system which will be described later.

Figure 3:
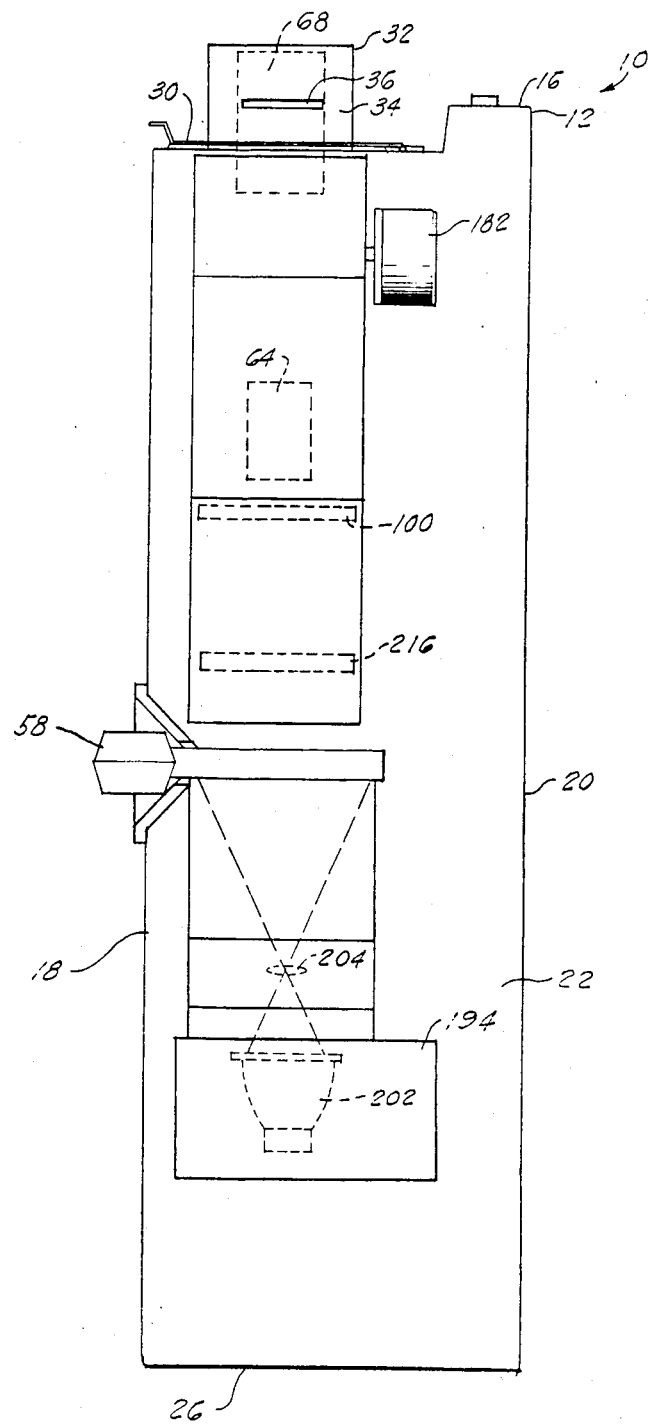
FIG. 3 is a side elevational view of the copier of FIG. 1.
Figure 10:
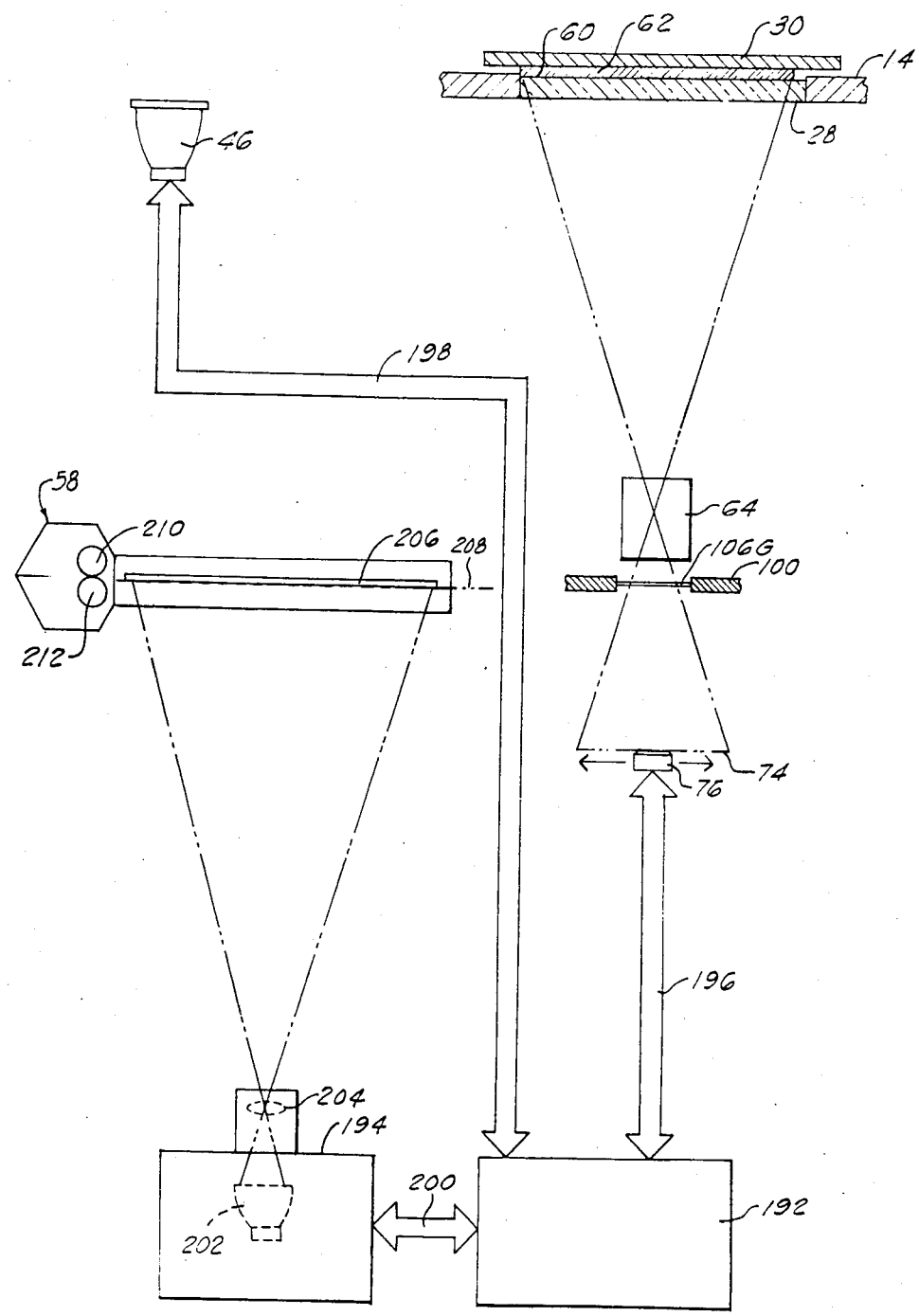
FIG. 10 is a diagrammatic illustration showing the optical paths and data transmission paths between selected components of copier 10 for a print copy mode of operation.

With reference to FIGS. 2,3 and 10, copier 10 additionally includes means for processing electronic signals provided from the photoresponsive device 76 in the form of a diagramatically illustrated signal processing unit 192, and means for converting processed image signals provided from unit 192 into an optical image which is projected onto a film unit in cassette 58 in the form of a diagramatically illustrated electronic imaging film recorder 194.

An overview of a typical print copying cycle is best explained with reference to FIG. 10. The cycle starts with a low resolution scan of the green component of print 62 supported on window 28. Wheel 100 is set so that the green filter 106g is registered with lens 64 which projects an image of the print 62 through the filter onto the image plane 74. The linear scanning CCD array is advanced or indexed across plane 74, a line at a time, and provides corresponding green component electronic image signals over a signal bus 196 to the signal processing unit 192 which stores the signals in a memory buffer. Next, wheel 100 is indexed to present the red filter 106r in alignment with lens 64 and the red component signals are written into memory. Once again, the wheel 100 is indexed to present the blue filter in alignment with lens 64 and the blue component signals are written into memory. At this point, a first set of image signals representative of a low resolution version of the image of print 62 are stored in memory.

As soon as the low resolution green component signals are stored in memory, they are sent to a video signal generator in unit 192 which provides a video signal output over signal bus 198 to the preview display CRT 46 to provide a black and white display indicative of the image that will be projected onto the copy film so that the operator may use it to check for composition, focus, etc.

Following the low resolution scan, copier 10 shifts to a high resolution scanning mode and provides a second set (red, green, and blue components) of signals over bus 196 to signal processing unit 192 representative of a higher resolution version of the print image provided by lens 64.

The higher resolution signals are not stored in memory but rather are fed through signal processor 192 in sequence for enhancement by combining them with certain of the low resolution signals stored in memory. The enhanced signals (a third set of signals representative of an enhanced version of the image) are transmitted over signal bus 200 to the film recorder 194. Recorder 194 has a CRT 202 therein which converts the image signals into a corresponding optical image that is projected, a line at a time, by a projection lens 204 onto a self-developing film unit 206 supported within cassette 58 at a film image plane 208 within housing 12. After the film unit 206 has been exposed to sequentially record the enhanced red, green, and blue components thereon, it is advanced from cassette 58 through a pair of opposed pressure-applying rollers 210 and 212 which are effective to release and distribute a processing liquid between selected layers of the film unit to initiate an image development and diffusion transfer process that is well known in the photographic art.

Copier 10 may be configured for use with a variety of self-developing film units, including self-developing film units marketed by Polaroid Corp., Cambridge, MA. Color print film may be of the peel-apart or integral type. For representative examples, see U.S. Pat. Nos. 2,983,606 and 3,594,165 which are incorporated by reference herein. Although copier 10 is most useful for making color copy prints, it may be configured to accept black and white print film or color and black and white transparency film. Also by providing an image reversal mirror between lens 204 and exposure plane 208, copier 10 may be adapted for use with integral film units, such as SX-70 film or the like, which requires an image reversal in the exposure path.

The film processing cassette 58 may be of the type which requires the operator to manually pull the exposed film unit between the rollers 210 and 212 or it may have motorized rollers. For examples of cassette 58 which may be used in copier 10 see U.S. Pat. Nos. 4,299,471 and Des. 244,089 which are incorporated by reference herein.

The photoresponsive device 76 in the illustrated embodiment comprises a linear array CCD device 214 enclosed in a housing 216. As noted earlier, it is configured to be indexed across the image plane 74 a line at a time for simultaneously reading and providing separate brightness or intensity signals for each image pixel in a line. To provide a high quality reproduction, the array 214 has a resolution of approximately 2000 dots or pixels/inch. One type of array 214 suitable for use in copier 10 is about one inch long and has 2,048 elements. That is, it is capable of separating each line of the image to be copied into 2,048 distinct pixels.

In the illustrated embodiment, the device 76 is adapted to be incrementally advanced across the image plane in 1500 steps. In this manner, the image scan by device 76 is divided into a matrix array of 2,048×1500 pixels.

Copier 10 includes means for incrementally advancing or indexing the photoresponsive device 76 across the image plane 74 in the form of a precision indexing mechanism 216 which is best shown in FIG. 9.

The indexing mechanism 216 comprises a support plate 218 having a pair of parallel, spaced apart, rods 220 extending outwardly therefrom for slidably supporting a movable carriage 222 having photoresponsive device 76 fixedly mounted thereon. The carriage 222 is adapted to be moved in precise steps back and forth along rods 220 by a pivotting lever 224 having one end 226 pivotally connected to a pivot support 228, fixed to and extending outwardly from plate 218, for pivotal motion about a pivot pin 230 which extends through lever 224, and its opposite end 232 coupled to an actuator arm or rod 234 of a linear actuator assembly 236.

The carriage 222 is connected to the midpoint of lever 224 by means of a coupling pin 238 thereon which is captured in a lever notch 240 by a leaf spring 241 on lever 224. By connecting the carriage 222 midway between the fulcrum end 226 and the opposite movable end 234 of the lever, a 2:1 reduction in carriage motion is achieved. That is, when the actuator arm 234 is advanced through a given distance, the carriage 222 only moves half the given distance.

The carriage 222 includes a base plate 242, having device 76 mounted thereon, which is secured to the underside of a generally L-shaped member 244 that is configured to slidably connect the carriage 222 to the guiderods 220.

One leg of member 244 carries the connecting pin 238 and has upstanding end sections 246 at opposite ends thereof. Each end section 246 has a V-shaped guide notch 250 therein for receiving a first rod 220 and a corresponding leaf spring connector 252 which extends over a major portion of the slot 250 to engage the upper surface of rod 220 and retain the rod 220 therein. The other leg of member 244 has an upstanding end section 254 having an L-shaped connector 256 thereon which extends over and engages the top surface of the other rod 220. In this manner, the carriage 222 is suspended on and slidably coupled to the rods 220 for reciprocal movement therealong.

The pivot support 228 includes a base plate section 258, fixedly mounted on plate 218, and a pair of parallel spaced-apart plates 260 extending outwardly from base plate 258. The outboard ends of plates 260 have corresponding V-shaped notches 262 therein for receiving and supporting the opposite ends of the lever pivot pin 230. Pin 230 is retained in notches 262 by a helical spring 263 having one end attached to pin 230 and its opposite end attached to a fixed pin 264 on support 228 for urging the pin 230 into the notches 262.

The reciprocating actuator assembly 236 includes the actuator arm 234 which is a finely threaded rod having a lever end receiving slot 266 at its outboard end. The arm 234 passes through an opening in plate 218 and through a rod driving unit 268 mounted on the backside of plate 218. The drive unit 268 includes therein a fixedly positioned and rotatably mounted motor driven nut (not shown) in mesh with the thread on rod 234 such that when the motor rotatably drives the nut, the rod 234 is advanced or retracted (depending on the direction of motor rotation) along its linear path of travel parallel to the carriage supporting rods 220. As the actuator arm 234 is driven along its linear path of travel, it pivots lever 224 and effects a linear motion of carriage 222 back and forth along the support rods 220. The aft end of rod 234 is adapted to engage a fixed stop or block 269 to set the actuator at the initial or first line position.

The CCD array 214 in device 76 is adapted to be moved so as to scan a centrally exposed rectangular field of the image plane 74 that measures approximately one inch wide (line length) by 0.75 inches deep (lines). The linear array 214 is one line width wide and divides the line into 2,048 pixels. The indexing device 216 is adapted to incrementally advance the array 214 across the field in 1,500 steps to provide 1,500 lines. Thus, the image focused at plane 74 is divided into a matrix array of 2,048×1,500 pixels.

The actuator assembly 236 is designed to advance the device 76 across the 0.75 inch deep field in 1,500 steps or 0.0005 inches per step. Because of the 2:1 motion reduction provided by the lever arrangement, the 0.0005 inch array steps may be made by advancing the actuator arm 234 0.001 inches per step.

This means that the overall cost of the indexing mechanism 216 is reduced because it is only necessary to employ an actuator assembly 236 that is capable of accurately and reliably indexing at 0.001 inches per step rather than a higher precision and more costly assembly 236 that is capable of advancing the actuator arm 234 in 0.0005 inch steps.

In the high resolution scan mode, the CCD device 76 is sequentially advanced to each of the 1500 line positions, and intensity signals are generated for each of the 2,048 pixels in the line. This generates approximately 3 megabits of information for each of the 3 high resolution color scans. To avoid having to provide a very large random access memory to store these high resolution signals, copier 10 only stores the low resolution signals in memory and feeds the high resolution signals directly to the signal processor 192 where they are combined with selected ones of the low resolution signals provided from memory to effect image enhancement.

In the low resolution scan mode, only about one quarter of the image information is acquired and stored in memory. This is significant in that the use of this technique substantially lowers the memory requirement and cost of copier 10.

In one type of low resolution scanning scheme, the CCD 76 is indexed to read every fourth line. At each fourth line, the CCD device 76 does not provide a reading for each pixel, but rather divides the line into blocks containing 4 consecutive pixels and provides an average intensity reading for each block. Utilizing this scheme, the low resolution scans can be completed in a shorter time period than high resolution scans because the CCD device 76 only has to stop at and read every fourth image line rather than every line.

It should be understood that other low resolution scanning schemes may be employed without departing from the spirit and scope of the invention involved herein. For example, in addition to averaging blocks of four pixels horizontally along a line, every line could be read and an average intensity signal could be provided for each vertical block of four lines. However, this would slow down the low resolution scanning rate.

Figure 11:
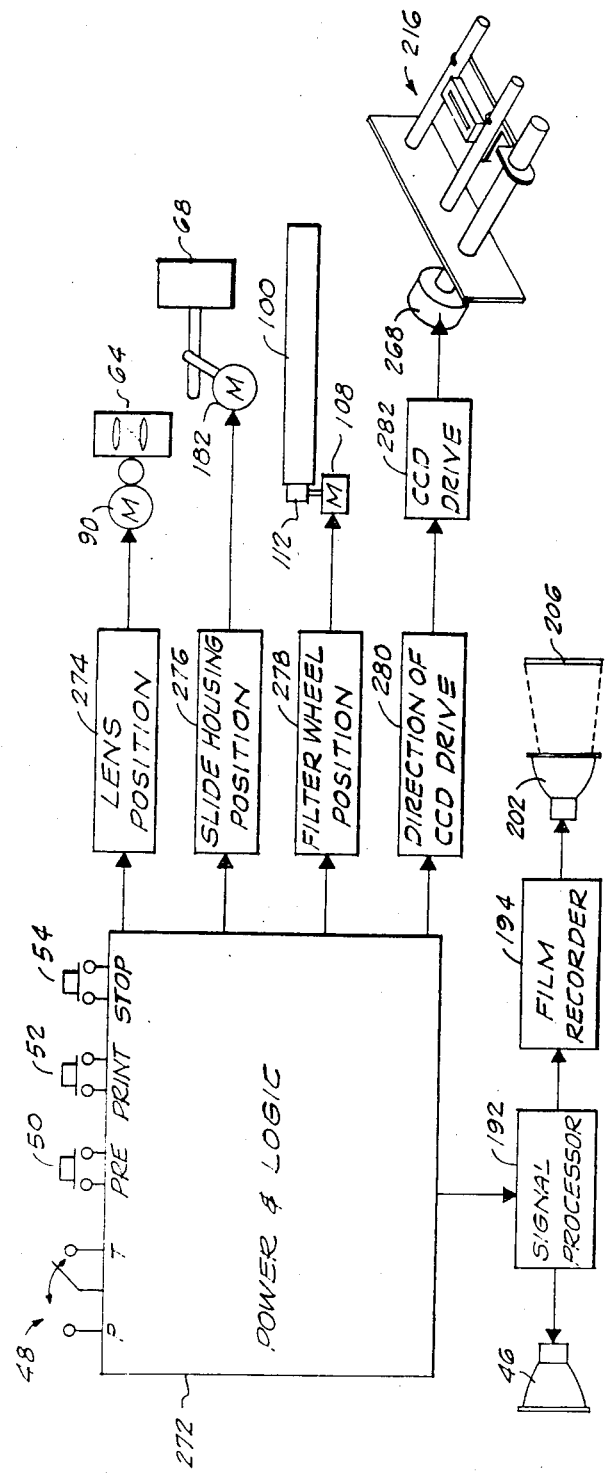
FIG. 11 is a diagrammatic representation of a system for controlling operation of copier 10.

With reference to FIG. 11, control over the operation of copier 10 is provided by a diagramatically illustrated control system 270 which includes a power and logic circuit 272 that provides electrical power to various copier components and subsystems and also provides the necessary logic functions to operate these components and subsystems in a coordinated manner. The logic section of circuit 272 preferably includes a microcomputer which is programmed to execute the sequence of operations making up a print or transparency copy cycle.

Circuit 272 responds to input signals provided when the operator manually actuates the control switches 48,50,52 and 54 and provides appropriate output control signals to various subsystems including the signal processor 192; a lens position circuit 274 which operates lens drive motor 90; a slide housing position circuit 276 which operates drive motor 182; a filter wheel position circuit 278 which operates filter wheel motor 108; and a circuit 280 which determines the direction of CCD drive and, in-turn, controls the operation of CCD drive circuit 282 that drives the linear actuator motor 268.

As noted earlier, one of the major advantages of copier 10 is that it is capable of electronically enhancing an image before it is projected onto the copy film 206. Enhancements may include color balancing; matching color and contrast range to the characteristics of the copy film; manipulation of contrast, saturation, hue and brightness; edge sharpening; and reversing the image using inverse video techniques that are well known in the art. By using inverse video, copier 10 may make a positive print from a negative image slide or transparency held in slide housing 12.

For examples of color enhancement techniques that may be incorporated into copier 10, reference may be had to the previously noted commonly assigned U.S. Pat. Nos. 4,488,244 and 4,536,848 along with copending applications U.S. Ser. Nos. 681,788, filed on Dec. 14, 1984, and 682,894 filed on Dec. 18, 1984.

Figure 12:
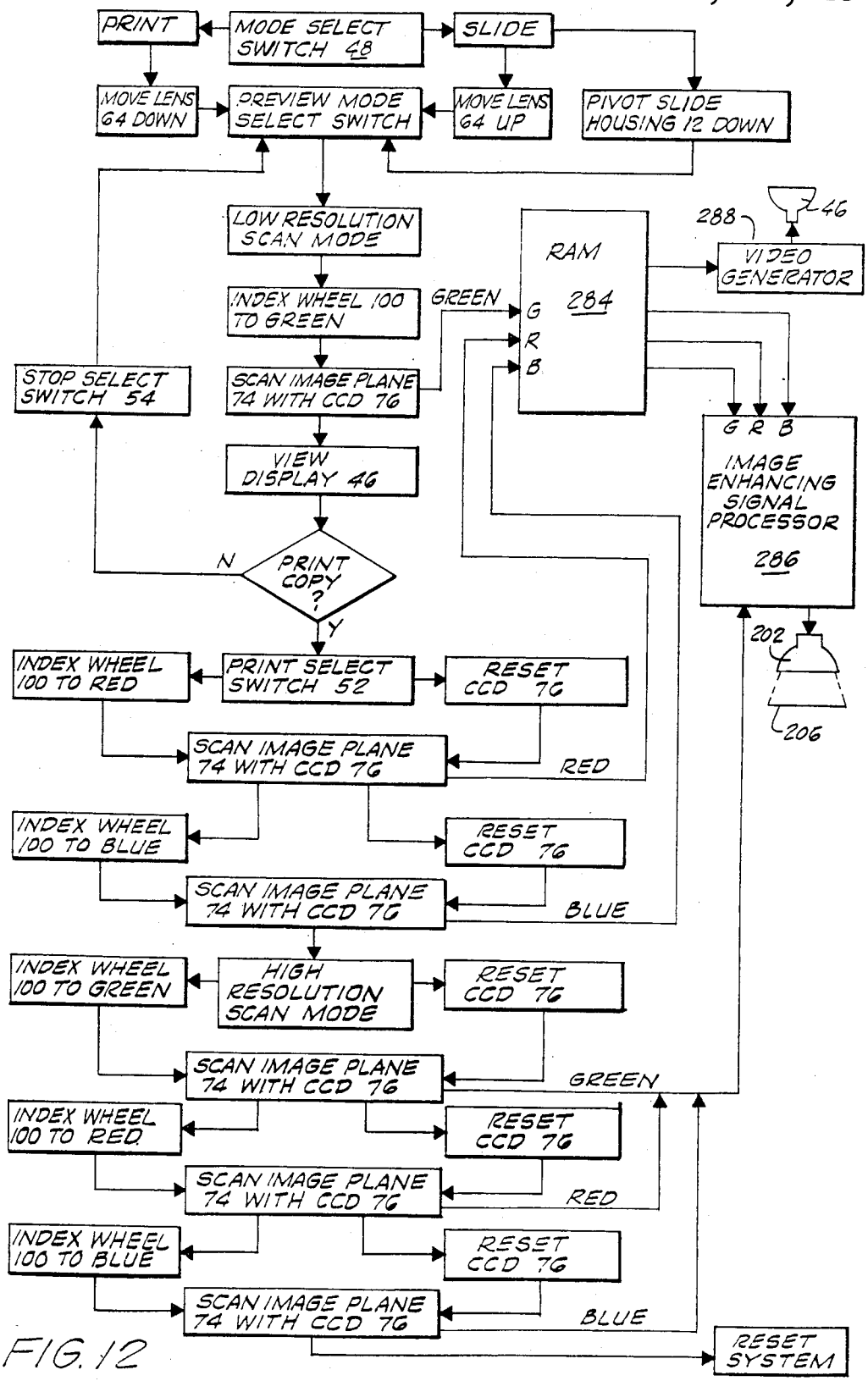
FIG. 12 is a flow diagram showing the sequence of operations in a print or slide copying cycle.

The operation of copier 10 now will be described with reference to the flow diagram shown in FIG. 12. In this diagram, selected components of the signal processor unit 192, comprising a random access memory (RAM) 284, an image enhancing signal processor 286 and a video signal generator 288, are shown separately.

The operator initially places a print 64 on window 28 or inserts a slide 66 into slide housing 68 located at its inoperative position in housing section 32. Then the operator moves the mode select knob 48 to the appropriate print or transparency position.

If the print mode is selected, circuit 272 responds to the actuation of switch 48 by operating the lens position circuit 274 which in turn moves the lens 64 down to its lowermost print imaging position. If the slide or transparency mode is selected, circuit 272 operates lens position circuit 274 to move the lens up to the slide copy position and additionally activates the slide housing position circuit 276 to pivot the slide housing 68 down to its operative position.

Following mode selection, the user then actuates the preview mode selection switch 50. In response, circuit 272 begins the low resolution scan mode of operation. It first operates the filter wheel position circuit 278 which drives the filter wheel 100 to locate the green filter 106g in alignment with the objective lens 64. Then, circuit 274 actuates the CCD drive direction circuit 280 causing the acutator assembly to scan image plane 74 with the CCD device 76. The low resolution green component signals are fed from the CCD device 76 into memory 284 for storage. The stored signals are fed from memory to the video generator 288 which feeds the green component signals to CRT 46 to provide a black and white display of the print or transparency as the case may be.

The operator views the displayed image to check it for composition and focus. If he is satisfied with the image, he would press the print or copy switch 52 to proceed with the copy cycle. If the operator is not satisfied with the displayed image he would actuate the stop select switch 54 which would terminate the print cycle and reset copier 10 to restart the preview mode upon acutation of switch 50. The operator may rearrange the position of the print or slide slightly to change composition and then begin another preview mode by actuating switch 50.

We will assume for the moment that the operator was satisfied with the displayed image and actuated the print mode switch 52. In response to actuation of switch 52, circuit 272 actuates the filter wheel position circuit 278 to index wheel 100 to the red filter and also actuates the direction of CCD drive circuit 280 to reverse the direction of CCD drive and move it back to the first line in preparation for the red low resolution scan.

When these two events are complete, circuit 272 actuates the appropriate circuits to scan the image plane 74 with the CCD device 76 in a manner similar to the previous low resolution green scan. The low resolution red component signals acquired during the scan are fed into memory 284 where they are stored.

Following completion of the low resolution red scan, circuit 272 causes the filter wheel 100 to index to the blue filter, resets CCD device 76 and scans the image plane 74 with CCD device 76 to acquire the low resolution blue component signals which likewise are fed to and stored in memory 284.

As noted earlier, in the low resolution scan mode the CCD 76 is indexed so that it only reads every fourth line and provides an average intensity signal for blocks of four pixels along the line.

In the high resolution scanning mode, wheel 100 is indexed to present the second green filter 106g in alignment with lens 64 and the CCD device 76 is reset to its starting position. This is followed by the high resolution scan of image plane 74 with the CCD device 76 to acquire the high resolution green component signals which are fed directly, a line at a time, to the image enhancing signal processor 286. Processor 286 also receives from memory 284 the low resolution green, red and blue components of the image which it selectively combines with the high resolution component to provide enhanced green component signals which it feeds to the output display CRT 202 for exposing the film unit 206.

As each line is scanned, the high resolution signals for that line undergo enhancement and are fed directly to CRT 202 to expose the film unit 206. So, the film is exposed a line at a time with the green component.

Then, circuit 272 indexes wheel 100 to present the second red filter 106r in alignment with lens 64 and resets the CCD device 76. The image plane 74 is scanned with the CCD device 76 to provide the high resolution red component signals which are fed into signal processor 286 for enhancement and then to the CRT 202 to expose the film unit 206.

Following exposure of the red component circuit 272 once again resets the CCD device 76 and indexes the filter wheel to present the blue filter in alignment with lens 64 and then initiates the high resolution blue component scan.

Following the blue component scan, circuit 272 resets the various system components to their initial state. If the slide copy mode was selected, the reset operation would include activating the slide housing position circuit 276 to pivot the slide housing 68 back up to its initial inoperative position so that the slide 66 therein may be withdrawn.

Following exposure of the film to all three color components, the film is processed by advancing it between the pair of pressure-applying rollers to initiate a development and diffusion transfer process that is well known in the self-developing film processing art.

In the illustrated embodiment copier 10 is configured to display a black and white image on the preview display CRT 46. However, it is within the scope of the invention to provide a color preview display. To do so, the CRT 46 would be of the color type and the preview mode would be delayed until the low resolution green, red and blue signals were stored in frame buffer or memory 284 at which point all three color component signals would be fed through video generator 288 to CRT 46.

Because certain changes or modifications may be made to the above described electronic imaging copier without departing from the scope and spirit of the invention involved herein, it is intended that all matter contained in the above description and accompanying drawings be interpreted as illustrative and not in a limiting sense.

What is claimed is:

1. An electronic imaging copier configured for print and transparency copying modes of operation for making enhanced photographic copies of reflection print and transparency types of photographs, said copier comprising: prising:
    means for supporting a print at a first object plane;
    means for supporting a transparency at a second object plane;
    optical means being selectively operable in the print copying mode for providing an optical image of a supported print at an image plane, and in the transparency copying mode for providing an optical image of a supported transparency at said image plane;
    photoresponsive means for sensing an image provided at said image plane and being operative to provide, in sequence, a first set of electronic image signals representative of a low resolution version of said image and a second set of electronic image signals representative of a higher resolution version of said image;
    memory means for storing said first set of signals;
    display means responsive to at least a portion of said first set of signals for displaying a low resolution version of said image;
    signal processing means for processing said first and second sets of signals to provide a third set of signals representative of an enhanced version of said image;
    means for supporting a photosensitive film unit at an exposure plane; and
    means responsive to said third set of signals for providing an optical image representative of said enhanced image and for projecting said enhanced image onto said exposure plane to record it on a film unit thereat.

2. The copier of claim 1 wherein said optical means includes an objective lens and said means for supporting a transparency is mounted for movement between an inoperative position wherein said transparency supporting means is not in operative relation with said objective lens and an operative position wherein said transparency supporting means is in operative relation with said objective lens.

3. The copier of claim 2 wherein said transparency supporting means is mounted for pivotal motion between its said inoperative and operative positions.

4. The copier of claim 3 wherein said objective lens is mounted for movement between a print imaging position, for providing an image of a supported print at said image plane, and a transparency imaging position for providing an image of a transparency at said image plane when said transparency supporting means is located in its said operative position.

5. The copier of claim 4 further including means operable for driving said transparency supporting means between its said inoperative and operative positions and means operable for driving said objective lens between its said print and transparency imaging positions.

6. The copier of claim 5 further including means for controlling the operation of said transparency supporting means drive means and said objective lens drive means so that during the print copy mode said objective lens is in said print imaging position and said tansparency supporting means is in its inoperative position and during the transparency copying mode said objective lens is in said transparency imaging position and said transparency supporting means is in said operative position.

7. The copier of claim 1 wherein said copier is configured to produce color copies of color prints and transparencies and said copier further includes means for presenting three different color filters, in sequence, between said objective lens and photoresponsive means such that said first and second sets of signals each include signals representative of said three different color components of said image.

8. The copier of claim 1 wherein said photoresponsive means is configured to scan said image at said image plane to provide said first and second sets of signals.

9. The copier of claim 8 wherein said photoresponsive means is configured to scan said image a line at a time.

10. The copier of claim 9 wherein said photoresponsive means includes a photoresponsive linear array for sensing a line of said image, said array being mounted for reciprocal movement across said image plane, and said copier further includes indexing means operable for incrementally advancing said array across said image plane a line at a time.

11. The copier of claim 10 further including a carriage mounting said array for said reciprocal movement and said indexing means includes means for reciprocally driving said carriage.

12. The copier of claim 11, wherein said means for reciprocally driving said carrier includes a linear actuator operable for providing linear reciprocal driving motion and means coupling said linear actuator in driving relation to said carriage.

13. The copier of claim 12 wherein said coupling means includes motion reduction means which is operable so that for a given distance of actuator drive motion said carriage is driven a distance less than said given distance.

14. The copier of claim 13 wherein said coupling means includes a lever mounted to pivot about one end thereof, and having an opposite end thereof coupled to said actuator, said carriage being connected to said lever, intermediate its said one and opposite ends, in motion following relation thereto to provide said motion reduction.

15. The copier of claim 1 wherein the film unit to be supported at said exposure plane is a self-developing film unit and said copier further includes means for processing the film unit following the recording of said image thereon.

16. The copier of claim 1 wherein said photoresponsive device is a charge coupled device linear array having a resolution of approximately 2000 pixels per inch.

17. The copier of claim 1 further including a filter wheel having at least one set of green, red and blue filters thereon, said wheel being mounted for rotation to sequentially present each of said filters in said at least one set between said optical means and said image plane.

18. The copier of claim 1 wherein said first set of electronic signals includes signals representative of the green, red and blue components of said image and said display means is responsive to said green component signals for providing a black and white representation of said image.

19. The copier of claim 1 further including means for illuminating a print located at said first object plane and means for illuminating a transparency located at said second object plane.

20. An electronic imaging copier configured for print and transparency copying modes of operation for making enhanced photographic copies of color reflection print and transparency types of photographs, said copier comprising:
  means for supporting a print at a first object plane;
  means for supporting a transparency and being mounted for movement between an inoperative position and an operative position wherein it supports a transparency at a second object plane;
  optical means, including an objective lens mounted for movement between print and transparency imaging positions, for providing an optical image of a print, supported at said first object plane, at an image plane when said objective lens is in said print imaging position and for providing an optical image of a transparency, supported at said second object plane, at said image plane when said objective lens is in said transparency imaging position;
  photoresponsive means for sensing an optical image at said image plane and being operative to provide, in sequence, a first set of electronic image signals representative of a low resolution version of said image and a second set of electronic image signals representative of a higher resolution version of said image;
  means for presenting green, red and blue filters, in sequence, intermediate said objective lens and said image plane such that said first and second sets of signals each include green, red and blue components of said image;
  memory means for storing said first set of signals;
  display means responsive to at least said green component of said first set of signals for displaying a low resolution version of said image;
  signal processing means for selectively processing said first and second set of signals to provide a third set of signals representative of an enhanced version of said image;
  means for supporting a photosensitive color film unit at an exposure plane; and
  means responsive to said third set of signals for providing an optical image representative of said enhanced image and for projecting said enhanced image onto said exposure plane to record it on the film unit thereat.

21. The copier of claim 20 wherein the transparency to be copied is a slide and said transparency supporting means includes a slide housing for receiving and supporting a slide therein, said slide housing being mounted for pivotal motion between said inoperative position wherein it is not in operative relation with said objective lens and said operative position wherein it locates the slide at said second object plane in operative relation with said objective lens located at its said transparency imaging position.

22. The copier of claim 21 wherein said slide housing further includes a friction wheel for facilitating movement of the slide into and out of said slide housing.

23. The copier of claim 20 wherein said photoresponsive means includes a CCD linear array for sensing a line of said image and said copier further includes a carriage mounting said array for reciprocal movement across said image plane and means for incrementally advancing said carriage such that said array scans said image a line at a time.

24. The copier of claim 23 wherein said advancing means includes a linear acutator and motion reduction means coupling said actuator and said carriage.

25. The copier of claim 24 wherein said motion reduction means includes a lever mounted to pivot about one end, and having an opposite end thereof coupled to said actuator, said carriage being connected to said lever, intermediate its said one and opposite ends, in motion following relation thereto to provide said motion reduction.

* * * * *